(12) United States Patent  
Otohata et al.

(10) Patent No.: US 8,088,505 B2  
(45) Date of Patent: Jan. 3, 2012

(54) FILM-PACKED BATTERY AND METHOD OF MANUFACTURING THE SAME

(75) Inventors: Makihiro Otohata, Tokyo (JP); Nobuaki Yoshioka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/929,797

(22) Filed: Feb. 16, 2011

(65) Prior Publication Data

US 2011/0143176 A1    Jun. 16, 2011

Related U.S. Application Data

(63) Continuation of application No. 10/512,844, filed on Oct. 29, 2004, now Pat. No. 7,901,806.

(30) Foreign Application Priority Data

Jul. 18, 2002    (JP) ................................. 2002-209847  
Jul. 16, 2003    (WO) ........................ PCT/JP03/09029

(51) Int. Cl.  
*H01M 2/12* (2006.01)  
*H01M 2/08* (2006.01)  
*H01M 2/02* (2006.01)

(52) U.S. Cl. ............ 429/56; 429/53; 429/162; 429/178

(58) Field of Classification Search ........................ None  
See application file for complete search history.

(56) References Cited

U.S. PATENT DOCUMENTS 6,703,162 B2 *    3/2004    Shiota et al. .................. 429/185

FOREIGN PATENT DOCUMENTS

| JP | 05-013061   | 1/1993  |
|----|-------------|---------|
| JP | 10-055792   | 2/1998  |
| JP | 11-086823   | 3/1999  |
| JP | 11-097070   | 4/1999  |
| JP | 2000-100399 | 4/2000  |
| JP | 2001-93489  | 4/2001  |
| JP | 2001-325926 | 11/2001 |
| JP | 2002-056835 | 2/2002  |
| JP | 2002-151020 | 5/2002  |
| JP | 2002-298795 | 10/2002 |

OTHER PUBLICATIONS

Japanese Office Action dated Jun. 22, 2010 with an English translation.

* cited by examiner

*Primary Examiner* — John S Maples  
(74) *Attorney, Agent, or Firm* — McGinn IP Law Group, PLLC

(57) ABSTRACT

A film-packed battery includes a battery element and a packing film which houses the battery element and includes a main heat-sealed portion which is formed around the battery element, and a projecting heat-sealed portion which projects from the main heat-sealed portion toward the battery element, and a gas releasing portion formed in the projecting heat-sealed portion and the main heat-sealed portion adjacent to the projecting heat-sealed portion, wherein a distal end of the gas releasing portion reaches the projecting heat-sealed portion and the gas releasing portion connects external air with a heat-sealed interface of the packing film.

20 Claims, 7 Drawing Sheets

FILM-PACKED BATTERY AND METHOD OF MANUFACTURING THE SAME

RELATED APPLICATIONS

The present Application claims priority to Japanese Patent Application No. 209847/2002 filed on Jul. 18, 2002, and International Application No. PCT/JP03/09029 filed on Jul. 16, 2003, and is a Continuation Application of U.S. patent application Ser. No. 10/512,844 which was filed on Oct. 29, 2004, and issued as U.S. Pat. No. 7,901,806 on Mar. 8, 2011.

BACKGROUND OF THE INVENTION

The present invention relates to a film-packed battery in which a battery element is stored in a film packing body and a method of manufacturing the same and, more particularly, to a film-packed battery which can appropriately cope with gas generation in an abnormality, and a method of manufacturing the same.

In recent years, strong demands have arisen for lower-weight, lower-profile batteries as power supplies for portable devices and the like. Regarding a battery packing body, in place of a conventional metal can case which is limited in weight reduction and profile reduction, a metal thin film or a laminated film formed of a metal thin film and a heat sealable resin film has been in use as a packing body which can be reduced in weight and profile and can take an arbitrary shape when compared to a metal can case.

As the laminated film, one which includes a metal thin film made of aluminum and a heat sealable resin film made of nylon to form a battery outer surface and polyethylene or polypropylene to form a battery inner surface is generally used. A cathode, an anode, and a battery element made of an electrolyte are stored in a packing body formed of the laminated film. The periphery of the packing body is heat-sealed.

Most of batteries that use metal can case as general packing bodies have a pressure safety valve which, when a gas is generated at the time of an abnormality and the pressure in the battery increases, releases the gas to the outside.

In a film-packed battery which uses a film as a packing body, however, it is difficult to provide a pressure safety valve due to the structure. When an abnormality occurs, the packing body expand to the limit with the generated gas. It is unknown where the packing body may rupture to blow the gas into the equipment, leading to an issue.

Japanese Patent Laid-Open No. 2000-100399 proposes a means with which part of the heat-sealed portion is sealed at a low temperature to form a safety valve. Japanese Patent Laid-Open No. 11-097070 proposes a means with which a non-heat-sealable resin sheet is interposed and heat-sealed to decrease the peeling strength, thus forming a safety valve. With the above means, however, the sealing reliability also decreases in a normal state where the pressure does not increase. Then, the seal portion is deteriorated, and inconveniences such as leakage of an electrolyte may occur. Also, the pressure for opening the safety valve at the time of an abnormality cannot be set accurately. Japanese Patent Laid-Open No. 2001-325926 disposes a scheme of forming a recessed groove in a laminated sheet and releasing the generated gas outside the battery. Even with this proposal, it is cumbersome to form the recessed groove, and the laminated sheet must be welded to an opposing laminated sheet in two steps. Accordingly, very cumbersome operations are needed.

SUMMARY OF THE INVENTION

It is an object of the present invention to provide a film-packed battery in which an accurate unsealing pressure necessary when the battery expands by gas generation in an abnormality can be set, and a member that serves as a pressure safety valve having a sealing reliability which does not deteriorate the battery characteristics in normal use can be provided easily.

A film-packed battery according to the present invention is characterized by comprising a cathode, an anode, a battery element made of an electrolyte, a packing film which stores the battery element and sealed by heat-sealing part of a bonding surface thereof around the battery element, a projecting heat-sealed portion formed in part of a heat-sealed portion by heat seal to project toward the battery element, and a gas releasing portion formed in at least one of the projecting heat-sealed portion and a heat-sealed portion adjacent thereto.

A method of manufacturing a film-packed battery according to the present invention is characterized by comprising the steps of storing a battery element in a packing film, sealing a bonding surface of the packing film around the battery element by heat seal, forming, in part of a heat-sealed portion by heat seal simultaneously with heat seal of the bonding surface, a projecting heat-sealed portion which is continuous toward the battery element, and forming a gas releasing portion in at least one of the projecting heat-sealed portion and a heat-sealed portion adjacent to the projecting heat-sealed portion.

DETAILED DESCRIPTION OF THE PREFERRED EMBODIMENTS

Figure 1:
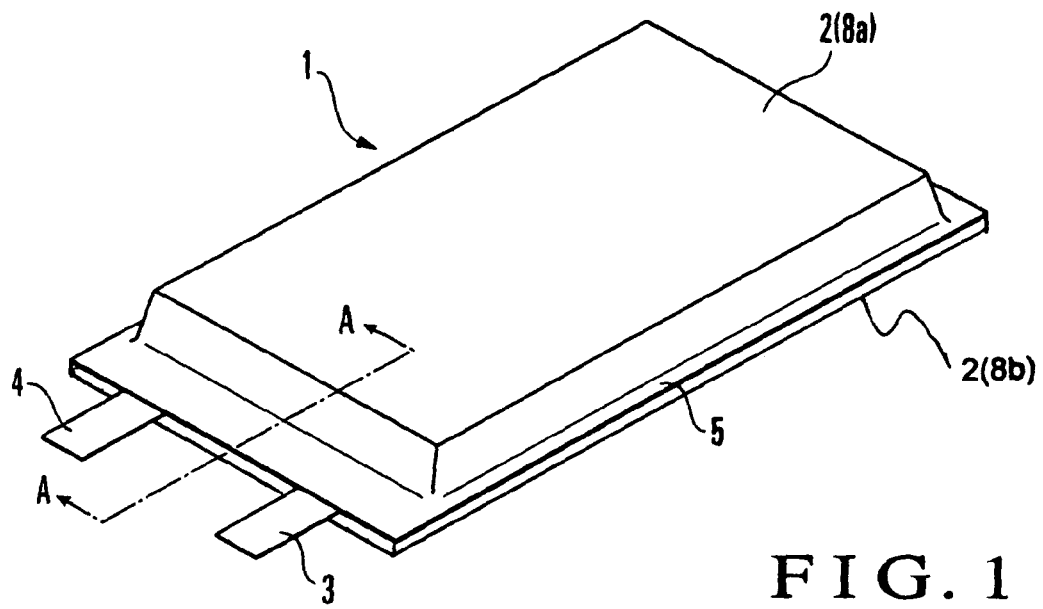
FIG. 1 is a perspective view showing the appearance of a film-packed battery according to the first embodiment of the present invention.

The embodiments of the present invention will be described with reference to the drawings.

First Embodiment

The first embodiment of the present invention will be described with reference to FIGS. 1, 2, 3, and 4. As shown in FIG. 4, a film-packed battery 1 has a packing body 2 storing a battery element 9, and a cathode lead terminal 3 and anode lead terminal 4 which are connected to the battery element 9 and project outside the packing body 2.

Figure 2:
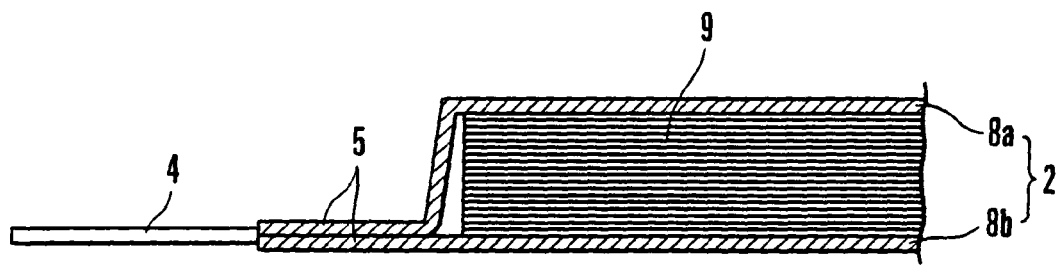
FIG. 2 is a longitudinal sectional view taken along the line A-A of FIG. 1.

As shown in FIG. 2, the packing body 2 includes an upper film 8a and lower film 8b. The two films 8a and 8b are heat-sealed around the battery element 9, as hatched in FIG. 3, to form a heat-sealed portion 5, and are bonded to each other.

A projecting heat-sealed portion 6 projecting toward the battery element 9 is continuously formed at the center of that side of the heat-sealed portion 5 where the cathode lead terminal 3 and anode lead terminal 4 are formed. A triangular gas releasing portion 7, the distal end of which reaches the projecting heat-sealed portion 6, is also formed. The gas releasing portion 7 has a function of allowing external air and the heat-sealed film interface to communicate with each other.

The projecting heat-sealed portion 6 can be formed, simultaneously with the heat-sealed portion 5, by heat seal when sealing the periphery of the packing body. Hence, the projecting heat-sealed portion 6 can be formed without requiring any particular step. Also, the projecting heat-sealed portion 6 can be heat-sealed with the same strength as that of the heat-sealed portion 5 on the periphery of the packing body 2. Thus, for example, leakage of an electrolyte does not occur, and the reliability of the pressure safety valve is not degraded when compared to the other heat-sealed portion 5.

Figure 3:
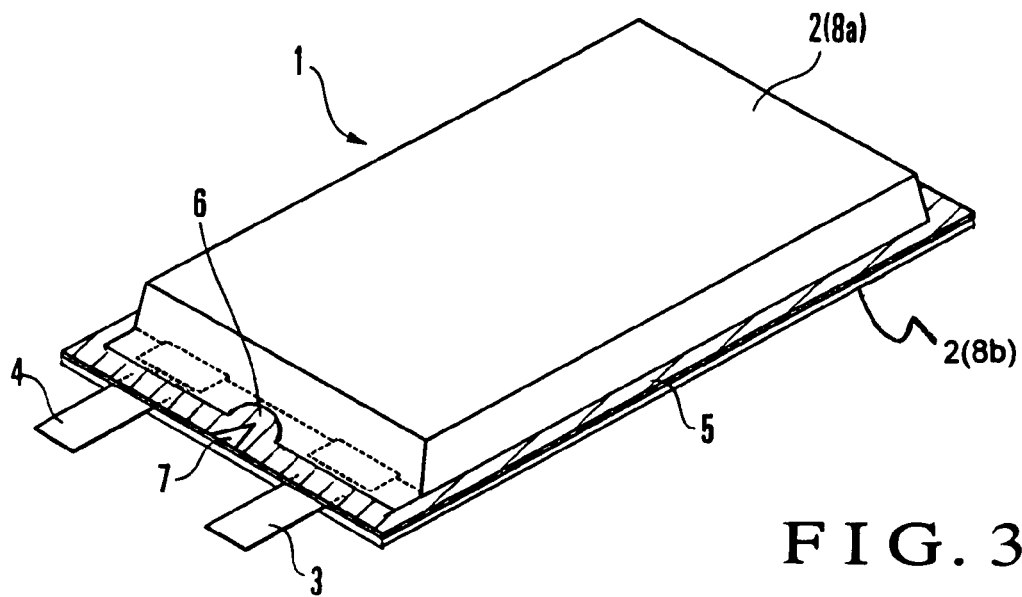
FIG. 3 is a perspective view in which the heat-sealed portion and projecting heat-sealed portion of the film-packed battery of FIG. 1 are hatched.
Figure 4:
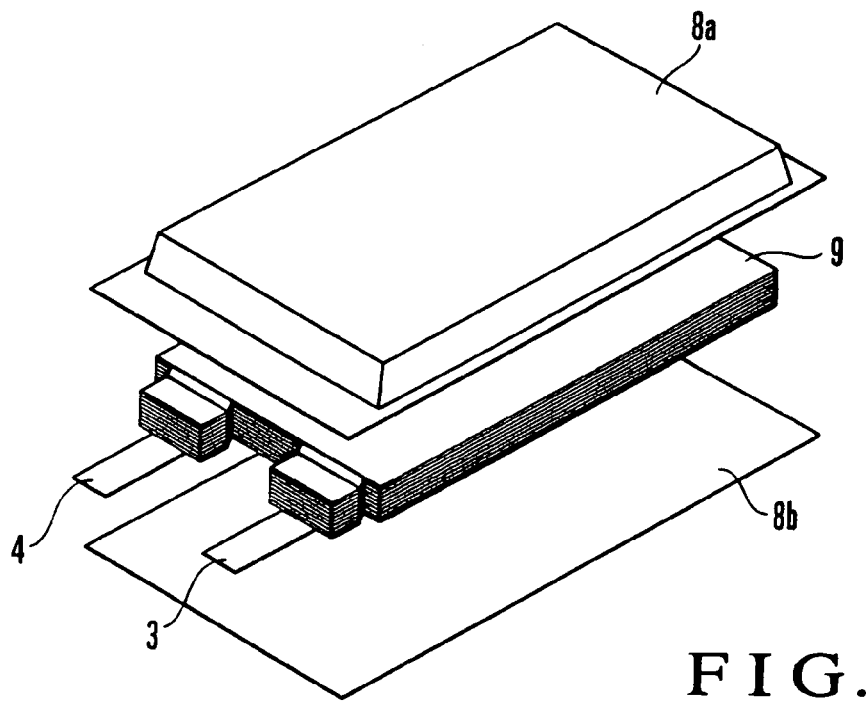
FIG. 4 is an exploded perspective view of the film-packed battery of FIG. 1.

As shown in FIG. 3, the gas releasing portion 7 of this embodiment is formed by setting up a portion that is not to be heat-sealed. If a heat-sealing head used for heat seal has such a shape that it heat-seals the projecting heat-sealed portion 6 but does not heat-seal the gas releasing portion 7 of the heat-sealed portion 5, the gas releasing portion 7 and projecting heat-sealed portion 6 can be formed easily.

As described above, according to this embodiment, the projecting heat-sealed portion 6 projecting toward the battery element is formed in part of the heat-sealed portion around the battery. When the packing body expands with gas generation in the case of an abnormality, a stress in a peeling direction concentrates at the projecting heat-sealed portion 6. The heat-sealed portion selectively peels off the projecting heat-sealed portion 6.

When peeling reaches the gas releasing portion 7 which is close to the projecting heat-sealed portion 6 and communicates with the external air such that the films 8a and 8b forming the packing body 2 are not heat-sealed to each other, the interior of the battery and the external air communicate with each other to release the gas in the battery outside, and rupture of the battery or blowing of the gas in an unintended direction is prevented. This function is called the function of the pressure safety valve.

Second and Third Embodiments

The second and third embodiments of the present invention will be described with reference to FIGS. 5 and 6.

Figure 5:
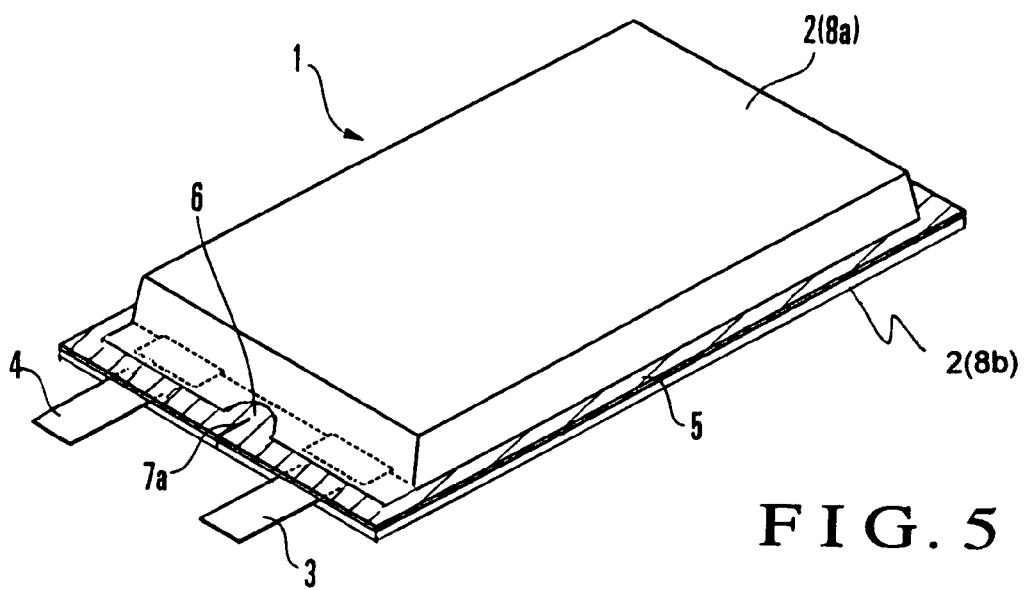
FIG. 5 is a perspective view showing the appearance of a film-packed battery according to the second embodiment of the present invention.

According to the second embodiment, as shown in FIG. 5, the shape of a gas releasing portion 7a with a distal end that reaches a projecting heat-sealed portion 6 is different from that of the first embodiment. The gas releasing portion 7a is formed not from a non-heat-sealed portion but from a linear incision that reaches the projecting heat-sealed portion 6 from the edge of a packing body 2.

The incision may be formed before or after the heat-sealing step. When the incision is to be formed before the heat-sealing step, it may be formed in only one of opposing films. In this embodiment, when the packing body expands with gas generation in an abnormality, a stress in a peeling direction concentrates at the projecting heat-sealed portion 6. The heat-sealed portion 5 selectively peels off the projecting heat-sealed portion 6, and the internal gas is released outside through the gas releasing portion 7.

Figure 6:
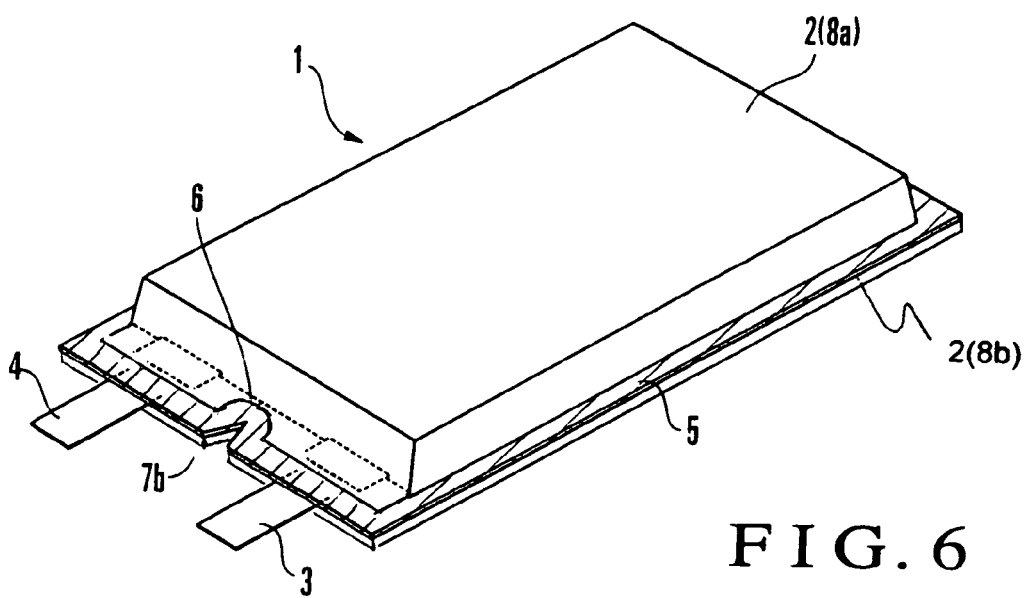
FIG. 6 is a perspective view showing the appearance of a film-packed battery according to the third embodiment of the present invention.

According to the third embodiment, as shown in FIG. 6, a gas releasing portion 7b is formed of an acute triangular notch with a distal end that reaches a projecting heat-sealed portion 6. In this embodiment, the stress generated by the generated gas concentrates at the projecting heat-sealed portion 6, and the generated gas is released outside through the gas releasing portion 7b. Thus, rupture of the battery or spurt of gas in an unintended direction is prevented.

Fourth Embodiment

The fourth embodiment of the present invention will be described with reference to FIGS. 7A and 7B.

Figure 7A:
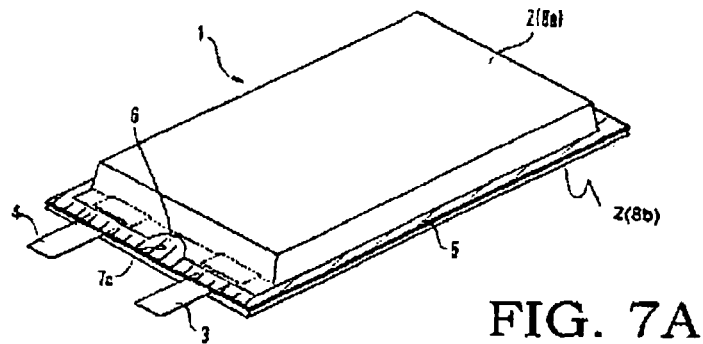
FIGS. 7A and 7B are perspective views showing the appearance of a film-packed battery according to the fourth embodiment of the present invention.
Figure 7B:
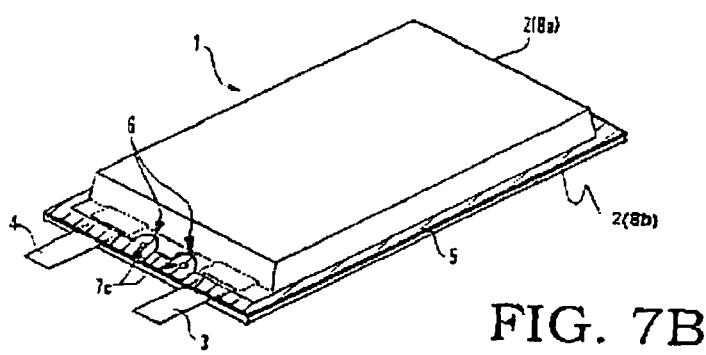

According to the fourth embodiment, as shown in FIG. 7A, a gas releasing portion 7c is formed as a hole formed in a projecting heat-sealed portion 6. It suffices as far as this hole is formed in at least one of two opposing films. Alternatively, this hole may be one that extends through the two opposing films, in the fourth embodiment, in the same manner as in other embodiments, a gas that can be generated in a battery peels the two films of the projecting heat-sealed portion 6, and is released outside through the gas releasing portion 7c formed as the hole. Alternatively, the film-packed battery 1 may include plural projecting portions 6, and plural gas releasing portions 7c, as illustrated in FIG. 7B.

Fifth Embodiment

The fifth embodiment of the present invention will be described with reference to FIG. 8.

Figure 8:
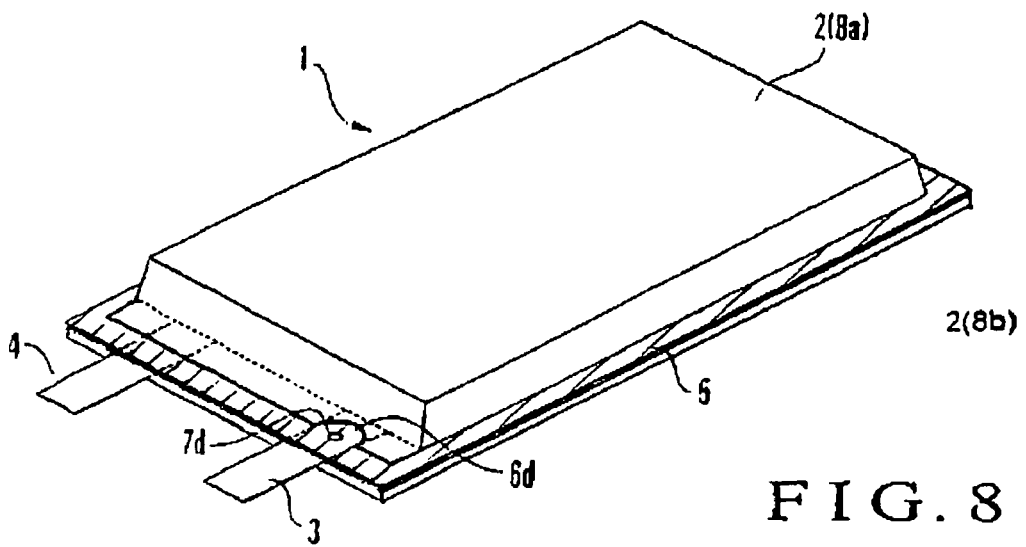
FIG. 8 is a perspective view showing the appearance of a film-packed battery according to the fifth embodiment of the present invention.

As shown in FIG. 8, the eighth embodiment is different in that a projecting heat-sealed portion 6d and gas releasing portion 7d are formed not between cathode and anode lead terminals 3 and 4, as in the first to fourth embodiment, but on the cathode lead terminal 3. The bonding strength of a heat-sealed portion 5 is generally lower at the bonding portions of films and lead terminals than at the bonding portions of films. When the projecting heat-sealed portion 6d and gas releasing portion 7d are formed on the cathode lead terminal 3, the valve unsealing pressure can be set low.

Although the projecting heat-sealed portion 6d and gas releasing portion 7d are formed on the cathode lead terminal in FIG. 8, they can be formed on the anode lead terminal 4. The whole projecting heat-sealed portion 6d need not be located on the cathode lead terminal 3, but it may be partially located on the cathode lead terminal.

Sixth Embodiment

The sixth embodiment of the present invention will be described with reference to FIG. 9.

Figure 9:
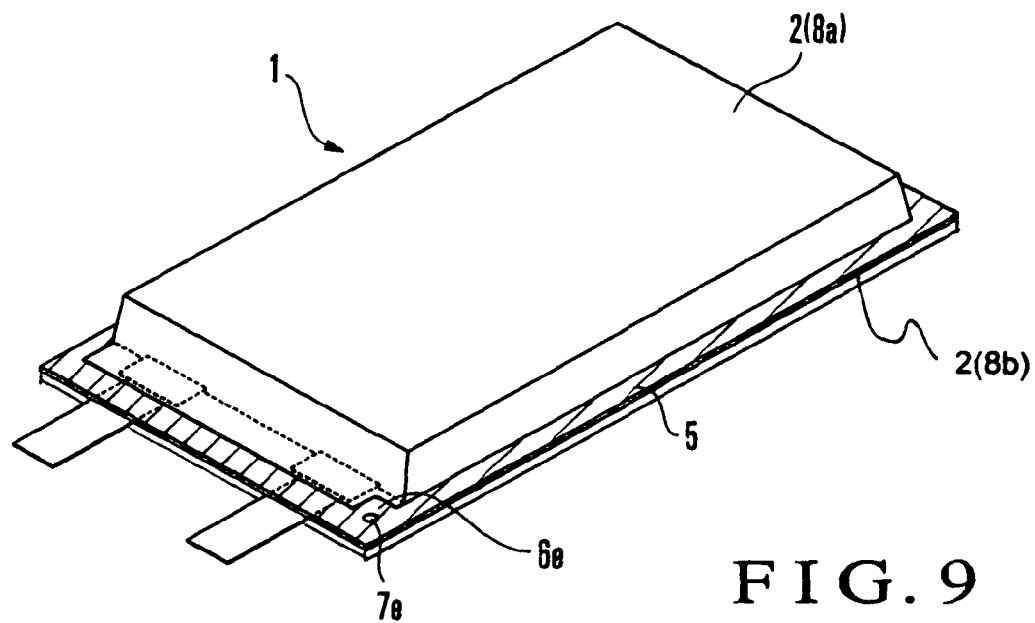
FIG. 9 is a perspective view showing the appearance of a film-packed battery according to the sixth embodiment of the present invention.

As shown in FIG. 9, the sixth embodiment is different in that a projecting heat-sealed portion 6e and gas releasing portion 7e are formed neither between cathode and anode lead terminals 3 and 4, as in the first to fourth embodiments, nor on the cathode lead terminal 3, as in the fifth embodiment, but on the corner of the packing body.

The projecting heat-sealed portion may be formed at an arbitrary position on the periphery of the packing body. Considering a battery element 9 and arrangement of the electrode lead terminals 3 and 4, the projecting heat-sealed portion is desirably formed at a location where it does not adversely affect the outer shape of the battery. When the projecting heat-sealed portion 6e and gas releasing portion 7e are formed at the corner of the packing body, as in this embodiment, the same effect can be obtained.

Seventh Embodiment

Figure 10:
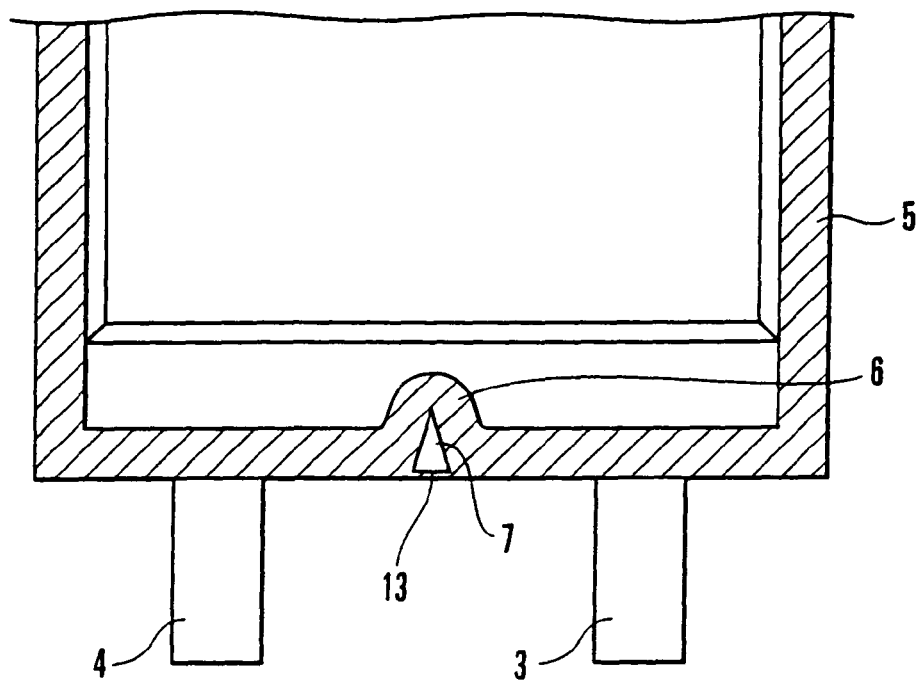
FIG. 10 is a perspective view showing the appearance of a film-packed battery according to the seventh embodiment of the present invention.

The seventh embodiment of the present invention will be described with reference to FIG. 10.

According to this embodiment, the external-air-side end of a gas releasing portion 7 formed as in the first embodiment is heat-sealed to form a seal portion 13. When the seal portion 13 is formed, external dust or the like can be prevented from clogging in the gas releasing portion 7 to hinder the operation of the pressure safety valve, or the gas releasing portion 7 can be prevented from forming an entry path for water vapor into the battery from outside to degrade battery characteristics.

The seal portion 13 must be sealed with a low strength that does not interfere with gas releasing when the seal portion 13 operates as a pressure safety valve. In FIG. 10, the seal portion 13 is formed by heat seal with a smaller width than that of the other heat-sealed portions 5. To decrease the bonding strength, the seal portion 13 may be formed by diffusion with a lower temperature than for the other heat-sealed portion 5.

Eighth Embodiment

Figure 11:
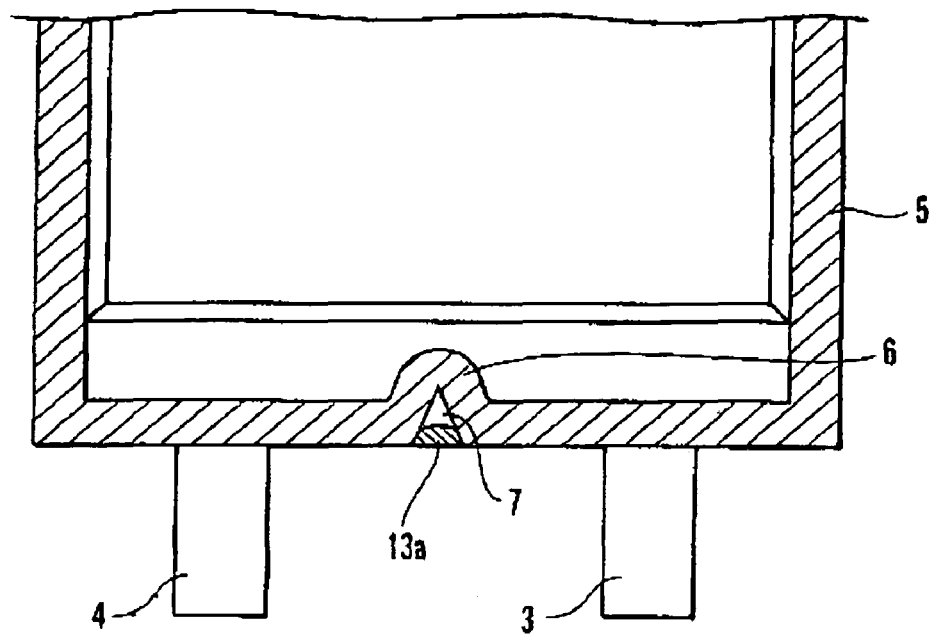
FIG. 11 is a perspective view showing the appearance of a film-packed battery according to the eighth embodiment of the present invention.

The eighth embodiment of the present invention will be described with reference to FIG. 11.

According to this embodiment, unlike in the seventh embodiment, a seal portion 13a is formed of an adhesive applied to the inner side of a gas releasing portion 7. Any other known method such as filling with a thermosetting resin may be used. The adhesive or resin desirably adheres with a small force so that it will not interfere with gas releasing when the seal portion 13a operates as a pressure safety valve. Alternatively, an adhesive or resin which is dissolved or decomposed by a battery element 9 component such as an electrolyte may be used.

Ninth Embodiment

Figure 12:
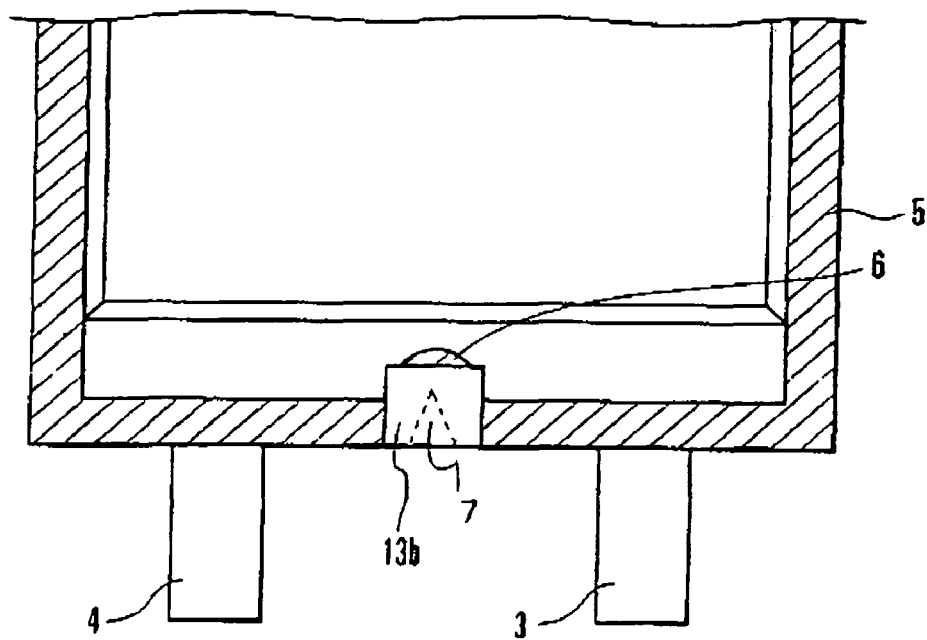
FIG. 12 is a perspective view showing the appearance of a film-packed battery according to the ninth embodiment of the present invention.

The ninth embodiment of the present invention will be described with reference to FIG. 12.

According to this embodiment, unlike in the seventh and eighth embodiments, a gas releasing portion 7 (shown by a dotted lined is covered with a tape to form a seal portion 13b. When a tape or seal is used, the seal portion 13b can be easily formed on the gas releasing portion 7. As the tape, a laminated film including a metal foil or metal thin film may be used. To bond the tape, a known method such as one that uses a pressure-sensitive adhesive, adhesive, or heat seal can be employed.

In each one of FIGS. 1 to 12, one projecting heat-sealed portion and one gas releasing portion are formed. Alternatively, two or more projecting heat-sealed portions and two or more gas releasing portions may be formed at arbitrary locations.

The arrangement and movement of a film-packed battery according to the present invention will described as an embodiment.

(Fabrication of Cathode)

A lithium manganate powder having a spinel structure, a carbonaceous conductivity imparting material, and polyvinylidene fluoride were mixed and dispersed in NMP (N-methyl-2-pyrrolidone) with a weight ratio of 90:5:5. The mixture was stirred to form a slurry. The amount of NMP was adjusted such that the slurry had an appropriate viscosity. Using a doctor blade, the slurry was uniformly applied to one surface of a 20-µm thick aluminum foil as a prospective cathode collector. Application was performed such that uncoated portions (portions where the collector was exposed) were slightly formed as stripes.

Subsequently, the resultant aluminum foil was dried at 100° C. in vacuum for 2 hrs. The slurry was similarly applied to the other surface, and the aluminum foil was dried in vacuum such that the uncoated portions on the front and rear surfaces coincided. The obtained sheet, the two surfaces of which were coated with an active material in this manner, was rolled with a press. The resultant sheet was cut into a rectangle to include the uncoated portions, thus forming a cathode plate 10. The active-material-uncoated portion was cut out to leave rectangular portions on its one side. The left portions were used as lead portions.

(Fabrication of Anode)

An amorphous carbon powder and polyvinylidene fluoride were mixed and dispersed in NMP with a weight ratio of 91:9. The mixture was stirred to form a slurry. The amount of NMP was adjusted such that the slurry had an appropriate viscosity.

Using a doctor blade, the slurry was uniformly applied to one surface of a 10-µm thick copper foil as a prospective anode collector. Application was performed such that uncoated portions (portions where the collector was exposed) were slightly formed as stripes. Subsequently, the resultant aluminum foil was dried at 100° C. in vacuum for 2 hrs.

The thickness of the active material layer was adjusted such that the ratio of theoretical capacitance per unit area of the anode layer to the theoretical capacitance per unit area of the cathode layer was 1:1. Similarly, the slurry was applied to the other surface, and the aluminum foil was dried in vacuum. The obtained sheet, the two surfaces of which were coated with the active material in this manner, was rolled with a press. The resultant sheet was cut into a rectangle including the uncoated portions, such that the rectangle was larger than the cathode by 2 mm in each of the vertical and horizontal sizes, thus forming a cathode plate 11. The active-material-uncoated portion was cut out to leave rectangular portions part on its one side. The left portions were used as lead portions.

(Fabrication of Battery Element)

Figure 13:
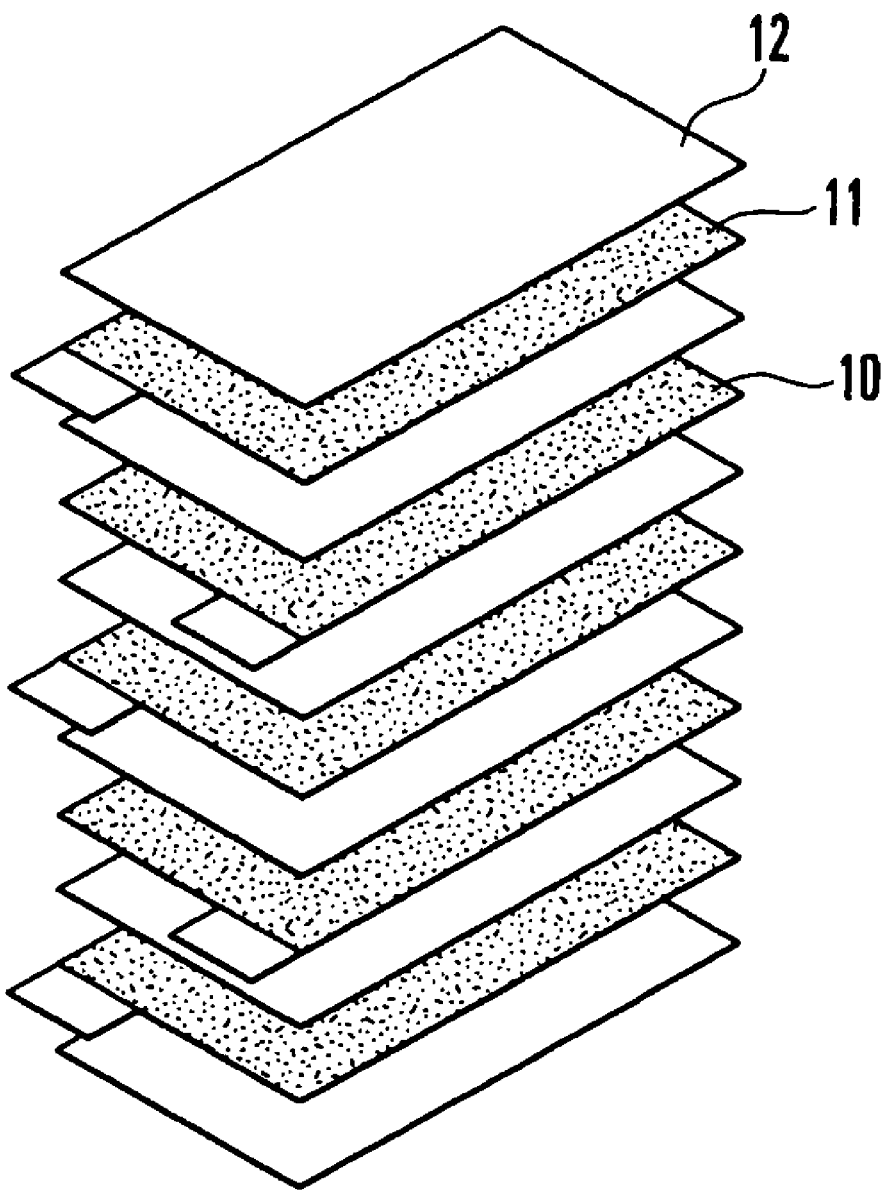
FIG. 13 is an exploded perspective view of a film-packed battery in a laminated state according to an embodiment.

The cathode and anode fabricated in the above manner, and microporous separators each having a three-layered structure of polypropylene/polyethylene/polypropylene were alternately stacked. As shown in FIG. 13, anodes appeared on the outermost sides of the electrodes, and separators were further placed on the outer side of the anodes (in the order of separator 12/anode 11/separator 12/cathode 10/separator 12/ . . . / anode 11/separator 12).

An aluminum plate was ultrasonic-welded to serve as a cathode plate lead and cathode lead terminal 3 for the stacked cathodes at once. Similarly, a nickel plate was ultrasonic-welded to serve as an anode lead And anode lead terminal 4 at once.

(Fabrication of Film-Packed Battery)

Fabrication of a film-packed battery will be described with reference to FIG. 4.

A storing portion having a size much larger than that of a battery element 9 was formed by deep drawing in a film 8a serving as an aluminum laminated film having a three-layered structure of nylon/aluminum/polypropylene, such that the polypropylene side was recessed.

The above battery element 9 was stored in the battery element storing portion of the film 8a such that only a cathode lead terminal 3 and anode lead terminal 4 of the battery element 9 projected from the packing film body. The battery element 9 was covered with another film 8b. The bonding portions were overlaid, and the three sides on the periphery of the packing body were bonded by heat seal. Regarding a heat-sealed portion 5 on a side from which the lead wires extend, it was bonded with a heat-sealing machine having a heat-sealing head which was to form, between the cathode and anode lead terminals, a projecting heat-sealed portion 6 projecting toward the battery element 9 and a gas releasing portion 7 formed of a non-diffused portion that reached the outer periphery of the heat-sealed portion 5 from the projecting heat-sealed portion 6.

An electrolyte was injected into the storing portion of the battery element 9 from one remaining side that was not been bonded. The electrolyte contained 1 mol/L of $LiPF_6$ as support salt and a mixed solvent of propylene carbonate and ethylene carbonate (weight ratio of 50:50) as a solvent. After injecting the electrolyte, the packing body was sealed in vacuum. A lithium ion secondary battery having a laminated film packing body was obtained.

The projecting heat-sealed portion is continuous to the heat-sealed portion and can be formed in one process simultaneously with formation of the heat-sealed portion. Hence, not only the work efficiency is improved, but also the heat-sealing strengths of the heat-sealed portion and projecting heat-sealed portion become substantially equal. Then, the gas generated inside reliably promotes peeling off the projecting heat-sealed portion. As a result, gas spray in an unintended direction is prevented reliably.

The gas releasing portion has a function of releasing the gas inside the battery when peeling of the projecting heat-sealed portion 6 due to the expansion of the packing body upon pressure increase has progressed to a regulated portion. The gas releasing portion may be present at the projecting heat-sealed portion or the heat-sealed portion adjacent to it, or across the projecting heat-sealed portion and heat-sealed portion.

(Operation of Pressure Safety Valve)

In the film-packed battery 1, upon occurrence of an abnormality such as external short-circuiting, when the temperature in the battery increases sharply and the packing body 2 expands due to gas generation, the stress generated by the expansion concentrates at the projecting heat-sealed portion 6. Hence, peeling of the heat-sealed portion 5 progresses selectively at the projecting heat-sealed portion 6. When peeling reaches the gas releasing portion 7, the interior of the battery and the external air communicate with each other. The gas generated in the battery is then released outside through the gas releasing portion 7.

The actuating pressure as the safety valve can be set arbitrarily in accordance with the positions and shapes of the projecting portion 6 and gas releasing portion 7. Furthermore, in a normal state with no gas generation, the same reliability as that of the other heat-sealed portion 5 can be maintained.

According to the embodiments described above, a heat-sealed portion projecting toward a battery element is formed, and a gas releasing portion is formed close to the projecting heat-sealed portion. Then, when the pressure in the battery increases upon gas generation, peeling of the projecting heat-sealed portion progresses selectively, and peeling reaches as far as the gas releasing portion. As a result, the gas in the battery can be released outside.

A film-packed battery in which the valve unsealing pressure can be arbitrarily set in accordance with the positions and shapes of the projecting heat-sealed portion and gas releasing portion and which has a function of a pressure safety valve having a high sealing reliability in normal use can be provided easily.

As described above, a film-packed battery according to the present invention in which a battery element is stored in a film packing body, and a method of manufacturing the same are suitably used in a power supply for a portable equipment or the like.

The invention claimed is:

1. A film-packed battery comprising:
a battery element;
a packing film which houses the battery element and includes:
a main heat-sealed portion which is formed around said battery element; and
a projecting heat-sealed portion which projects from said main heat-sealed portion toward said battery element; and
a gas releasing portion formed in at least one of said projecting heat-sealed portion and said main heat-sealed portion, wherein a distal end of said gas releasing portion reaches said projecting heat-sealed portion and said gas releasing portion connects external air with a heat-sealed interface of said packing film.

2. The film-packed battery according to claim 1, wherein said gas releasing portion is formed at that portion of said heat-sealed portion which is not heat-sealed.

3. The film-packed battery according to claim 1, wherein said packing film comprises:
a first film formed on a side of said battery element; and
a second film formed on another side of said battery element, said first film being heat-sealed to said second film in said main heat-sealed portion and said projecting heat-sealed portion.

4. The film-packed battery according to claim 3, wherein said gas releasing portion comprises an incision that is formed in one of said first and second films and reaches said projecting heat-sealed portion.

5. The film-packed battery according to claim 3, wherein said gas releasing portion comprises a notch that is formed in one of said first and second films and reaches said projecting heat-sealed portion.

6. The film-packed battery according to claim 3, wherein said gas releasing portion comprises a hole formed in one of said first and second films.

7. The film-packed battery according to claim 1, wherein said projecting heat-sealed portion and said gas releasing portion are formed on a side from which electrode lead wires extend.

8. The film-packed battery according to claim 1, wherein said projecting heat-sealed portion and said gas releasing portion are formed in an electrode lead wire extending portion.

9. The film-packed battery according to claim 1, wherein said projecting heat-sealed portion and said gas releasing portion are formed at a corner of said packing film.

10. The film-packed battery according to claim 1, wherein said projecting heat-sealed portion and said gas releasing portion are formed at substantially a center of a side of said packing film.

11. The film-packed battery according to claim 1, wherein said gas releasing portion includes a seal portion having a pressure resistance which is less than a pressure resistance of said main heat-sealed portion adjacent to said gas releasing portion.

12. The film-packed battery according to claim 11, wherein said seal portion is heat-sealed at a temperature lower than that for another heat-sealed portion.

13. The film-packed battery according to claim 11, wherein said seal portion has a heat-sealing width less than a heat-sealing width of said adjacent main heat-sealed portion.

14. The film-packed battery according to claim 11, wherein said seal portion is sealed with an adhesive or resin.

15. The film-packed battery according to claim 14, wherein said adhesive or resin is dissolved by at least one component of said battery element.

16. The film-packed battery according to claim 14, wherein said adhesive or resin is decomposed by at least one component of said battery element.

17. The film-packed battery according to claim 11, wherein said seal portion is formed by covering said gas releasing portion with a tape or seal.

18. The film-packed battery according to claim 1, wherein said projecting heat-sealed portion comprises plural projecting portions, and said gas releasing portion comprises plural gas releasing portions.

19. The method of manufacturing a film-packed battery, comprising:
   storing a battery element in a packing film, comprising:
      forming a main heat-sealed portion which is formed around said battery element; and
      forming a projecting heat-sealed portion which projects from said main heat-sealed portion toward said battery element; and
   forming a gas releasing portion, a distal end of which reaches said projecting heat-sealed portion, in at least one of said projecting heat-sealed portion and said main heat-sealed portion to connect external air with a heat-sealed interface of said packing film.

20. The method of manufacturing a film-packed battery according to claim 19, wherein said forming the projecting heat-sealed portion by heat seal includes forming, simultaneously with formation of the projecting heat-sealed portion, the gas releasing portion by not heat-sealing part of the heat-sealed portion.

* * * * *